(12) United States Patent
Nakano et al.

(10) Patent No.: US 6,171,671 B1
(45) Date of Patent: Jan. 9, 2001

(54) RUBBER COMPOSITIONS AND PRODUCTS DEVOID OF ZINC

(75) Inventors: Sadayuki Nakano, Ichihara; Eiichi Daikai, Inuyama; Ayumu Ikemoto, Komaki, all of (JP)

(73) Assignees: Sumitomo Chemical Co., Osaka; Tokai Rubber Industries, Ltd., Aichi, both of (JP)

( * ) Notice: Under 35 U.S.C. 154(b), the term of this patent shall be extended for 0 days.

(21) Appl. No.: 09/118,073

(22) Filed: Jul. 17, 1998

(30) Foreign Application Priority Data

Jul. 17, 1997 (JP) .................................................. 9-192664

(51) Int. Cl.$^7$ ....................................................... C08K 5/39
(52) U.S. Cl. ..................... 428/36.92; 138/138; 428/36.9; 428/36.91; 524/202; 524/203
(58) Field of Search ..................................... 524/202, 203; 428/36.9, 36.91, 36.92; 138/138

(56) References Cited

U.S. PATENT DOCUMENTS

| | | | |
|---|---|---|---|
| 2,628,952 | * 2/1953 | Sanders et al. | 260/45.75 |
| 3,534,123 | 10/1970 | Bostock et al. | 260/888 |
| 4,006,119 | * 2/1977 | Beadle et al. | 260/45.75 N |
| 4,632,950 | * 12/1986 | Kmiec et al. | 524/202 |
| 4,764,565 | 8/1988 | Iwasa et al. | 525/352 |
| 5,804,269 | * 9/1998 | Ozawa et al. | 428/36.91 |

FOREIGN PATENT DOCUMENTS

| | | | |
|---|---|---|---|
| 198 20 450 A1 | 11/1998 | (DE) . | |
| 595551B1 | 4/1997 | (EP) | F16L/47/00 |

OTHER PUBLICATIONS

Hofmann, "Kautschuk–Technologie", Gentner Verlag Stuttgart, 1980, p. 277.
Derwent Abstract. Ref. 82–77630E/37, re JP 57 126–663–A.
Derwent Abstract, Ref. 83–824728/47, re SU –231–811–A.
Derwent Abstract, Ref. 84–097849/16, re JP 59043–244–A.
Derwent Abstract, Ref. 84–215802/35 re JP 59124–942–A.
Derwent Abstract, Ref. 98–105207/10 re JP 09325896–A.

* cited by examiner

*Primary Examiner*—Ellis Robinson
*Assistant Examiner*—Sandra M. Nolan
(74) *Attorney, Agent, or Firm*—Pillsbury Madison & Sutro LLP

(57) ABSTRACT

A rubber composition comprising:
(A) at least one copolymer ingredient selected from the group consisting of ethylene/$\alpha$-olefin copolymer rubber and ethylene/$\alpha$-olefin/unconjugated diene copolymer rubber,
(B) nickel diisobutyldithiocarbamate, and
(C) carbon black,
and not containing any compound having zinc;
a vulcanized rubber composition obtained by vulcanizing the rubber composition; and
a heat-resistant rubber product using the vulcanized rubber composition.

10 Claims, No Drawings

RUBBER COMPOSITIONS AND PRODUCTS DEVOID OF ZINC

BACKGROUND OF THE INVENTION

1. Field of the Invention

The present invention relates to a rubber composition, a vulcanized rubber composition, and a heat-resistant rubber product (e.g., radiator hose, heater hose, or radiator packing) using the same.

2. Related Background Art

As radiator hoses, heater hoses, and radiator packing, ethylene/α-olefin copolymer rubber or ethylene/α-olefin/unconjugated diene copolymer rubber such as ethylene/propylene rubber (EPM) or ethylene/propylene/unconjugated diene rubber (EPDM) has conventionally been in wide use. Here, ethylene/α-olefin copolymer rubber and ethylene/α-olefin/unconjugated diene copolymer rubber are used as vulcanized rubber which has been vulcanized with an organic peroxide. In this case, it has been common technical knowledge that a zinc-containing compound such as zinc oxide is used as an essential component compounded in a rubber composition in order to prevent aging. When a rubber composition including a zinc-containing compound is employed as a radiator hose, heater hose, or radiator packing, however, zinc is likely to dissolve in a cooling medium, thereby affecting mechanical systems.

SUMMARY OF THE INVENTION

In view of such a problem, it is an object of the present invention to provide a rubber composition, a vulcanized rubber composition, and a heat-resistant product (e.g., radiator hose, heater hose, and radiator packing) which are mainly composed of ethylene/α-olefin copolymer rubber and/or ethylene/α-olefin/unconjugated diene copolymer rubber, employ no zinc-containing compound causing the above-mentioned problem, and are excellent in age resistance.

The inventors have conducted diligent studies in order to solve the above-mentioned problem and, as a result, have attained the present invention.

The rubber composition of the present invention is a rubber composition comprising:

(A) at least one copolymer ingredient selected from the group consisting of ethylene/α-olefin copolymer rubber and ethylene/α-olefin/unconjugated diene copolymer rubber;

(B) nickel diisobutyldithiocarbamate; and (C) carbon black; and not containing any compound having zinc.

The vulcanized rubber composition of the present invention is a vulcanized rubber composition which is obtained by vulcanizing the above-mentioned rubber composition with an organic peroxide.

The heat-resistant rubber product of the present invention is a heat-resistant rubber product employing the above-mentioned vulcanized rubber composition. Examples of the heat-resistant rubber product include radiator hose, heater hose, and radiator packing.

DESCRIPTION OF THE PREFERRED EMBODIMENTS

The ingredient (A) in the rubber composition of the present invention is ethylene/α-olefin copolymer rubber and/or ethylene/α-olefin/unconjugated diene copolymer rubber.

Examples of α-olefin in ethylene/α-olefin copolymer rubber and ethylene/α-olefin/unconjugated diene copolymer rubber include propylene, 1-butene, 1-pentene, 1-hexene, 4-methyl-1-pentene, 1-octene, 1-decene, and so forth. Above all, propylene is preferable. Examples of unconjugated diene include chain unconjugated dienes such as 1,4-hexadiene, 1,6-octadiene, 2-methyl-1,5-hexadiene, 6-methyl-1,5-heptadiene, and 7-methyl-1,6-octadiene; cyclic unconjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, 1,3,7-octatriene, and 1,4,9-decatriene. Above all, 1,4-hexadiene, dicyclopentadiene, and 5-ethylidene-2-norbornene are preferable.

As the copolymer ingredient (A) in the present invention, for example, at least one copolymer ingredient selected from the group consisting of ethylene/propylene copolymer rubber, ethylene/propylene/1,4-hexadiene copolymer rubber, ethylene/propylene/dicyclopentadiene copolymer rubber, and ethylene/propylene/5-ethylidene-2-norbornene copolymer rubber is preferably used.

Here, as ethylene/α-olefin copolymer rubber or ethylene/α-olefin/unconjugated diene copolymer rubber, oil-extended rubber containing an extender oil may also be used.

The molar ratio of ethylene/α-olefin in the ingredient (A) is preferably 40/60 to 85/15. The iodine value of the ingredient (A) is preferably 0 to 40.

The ingredient (B) in the rubber composition of the present invention, nickel diisobutyldithiocarbamate, is used as an age resistor in order to maintain heat resistance at a high level.

The amount of use of the ingredient (B) is preferably 1 to 20 parts by weight, more preferably 1 to 5 parts by weight, per 100 parts by weight of the ingredient (A). When the amount of ingredient (B) is too small, age resistance may become insufficient; whereas, when the amount of ingredient (B) is too large, age resistance may be saturated, thus becoming uneconomical. In the case where oil-extended rubber is used as the ingredient (A), the amount (100 parts by weight) of ingredient (A) is based on the weight of rubber ingredient excluding the extender oil.

The ingredient (C) in the rubber composition of the present invention, carbon black, is used for maintaining strength and weather resistance at high levels. Its amount of use is preferably 10 to 200 parts by weight, more preferably 40 to 140 parts by weight, per 100 parts by weight of the ingredient (A).

In the present invention, it is particularly important that nickel diisobutyldithiocarbamate is used and that no zinc-containing compound such as zinc oxide is used. As a consequence, the above-mentioned problem caused by zinc is overcome, and aging phenomena exemplified by deterioration of such characteristics as tensile strength, elongation, hardness and the like can be prevented.

As the organic peroxide for vulcanizing the rubber composition of the present invention to yield the vulcanized rubber composition of the present invention, organic peroxides typically used for crosslinking rubber compositions can be employed. Examples thereof include di-t-butyl peroxide, t-butylcumyl peroxide, dicumyl peroxide, α,α-bis(t-butylperoxyisopropyl)benzene, 2,5-dimethyl-2,5-di(t-butylperoxy)hexane, 2,5-dimethyl-2,5-di(t-butylperoxy)

hexyne-3, 1,1-bis(t-butylperoxy)-3,3,5-trimethylcyclohexane, n-butyl-4,4-bis(t-butylperoxy)valerate, 2,2-bis(t-butylperoxy)butane, 2,2-bis(t-butylperoxy)octane, and the like.

The amount of use of the organic peroxide is preferably 1 to 10 parts by weight, more preferably 2 to 6 parts by weight, per 100 parts by weight of the copolymer ingredient. When the amount of use is too small, crosslink density may become so low that the vulcanized rubber composition may yield an insufficient mechanical strength; whereas, when the amount of use is too large, shortcomings such as bubbling may occur upon vulcanized molding. In order to improve crosslinking efficiency upon vulcanization with the organic peroxide, known crosslinking assistant such as p,p'-dibenzoylquinone dioxime, quinone dioxime, triallyl cyanurate, sulfur, ethylene dimethacrylate, N,N'-m-phenylenebismaleimide, triallyl isocyanurate, trimethylolpropane trimethacrylate, metal acrylate, and the like may be used as well.

In order to obtain the vulcanized rubber composition of the present invention by use of the rubber composition of the present invention, for example, not only (A) ethylene/α-olefin copolymer rubber and/or ethylene/α-olefin/unconjugated diene copolymer rubber, (B) nickel diisobutyldithiocarbamate, and (C) carbon black, as well as the organic peroxide, but also, when necessary, antioxidant, vulcanization accelerator, processing assistant, stearic acid, reinforcing agent, filler, plasticizer, softener, and the like (restricted to those containing no zinc) are mixed by means of a normal kneader such as roll, Banbury, or the like so as to yield a vulcanizable rubber composition, which is then vulcanized for about 1 to 60 minutes preferably at a temperature not lower than 120° C., more preferably within the range of 150° to 220° C. For vulcanization, any of press vulcanization, steam vulcanization, and the like may be employed.

The vulcanized rubber composition of the present invention obtained by the rubber composition of the present invention can be processed into the heat-resistant rubber product of the present invention (e.g., radiator hose, heater hose, or radiator packing) by a normal method. Such a product is a quite excellent product having the characteristics explained above.

In the following, the present invention will be explained with reference to examples and comparative examples. The present invention, however, should not be restricted to the following examples.

EXAMPLE 1 AND COMPARATIVE EXAMPLES 1 TO 14

As the copolymer ingredient, 80 parts by weight of ethylene/propylene/ethylidenenorbornene copolymer rubber (E532, manufactured by Sumitomo Chemical Co., Ltd.; Mooney viscosity $ML_{1+4}$ 121° C.: 80; ethylene content: 52% by weight; iodine value: 12) and 20 parts by weight (amount based on the polymer ingredient excluding the extender oil) of ethylene/propylene/ethylidenenorbornene copolymer rubber (E601F, manufactured by Sumitomo Chemical Co., Ltd.; Mooney viscosity $ML_{1+4}$ 121° C.: 63; ethylene content: 62% by weight; iodine value: 12; 70-phr oil-extended) were used as being mixed together. To 100 parts by weight of this copolymer ingredient, not only the compounds listed in the column of "Added Compound" in Tables 1 to 3, but also 75 parts by weight of Asahi 50HG (carbon black, manufactured by Asahi Carbon Co., Ltd.), 60 parts by weight of Asahi 60G (carbon black, manufactured by Asahi Carbon Co., Ltd.), 70 parts by weight of Diana PW380 (paraffin oil, manufactured by Idemitsu Kosan Co., Ltd.), and 1 part by weight of stearic acid were added. The resulting mixture was kneaded for 5 minutes at a rotor speed of 60 rpm by a 1700-ml Banbury mixer adjusted to a starting temperature of 80° C. Thereafter, an 8-inch open roll was used for adding and kneading 7 parts by weight of DCP (40% dicumyl peroxide product, manufactured by NOF Corp.) and 2 parts by weight of acrylic ester ED (crosslinking assistant, manufactured by Mitsubishi Rayon Co., Ltd.), thus yielding a rubber composition. Then, this rubber composition was press-vulcanized at 170° C. for 20 minutes so as to yield a vulcanized rubber composition. The vulcanized rubber composition was evaluated in conformity to JIS K-6301. Also, its heat resistance was evaluated in terms of the ratios of change in tensile strength and elongation as well as value of change in hardness before and after being left for 360 hours at 150° C. in the air. The radiator liquid immersion test was carried out as noted in the following.

Tables 1 to 3 show the conditions and results obtained.

Method of Radiator Liquid Immersion Test (1) Distilled water was added to a coolant liquid (long life coolant, hereinafter referred to as "LLC") so that the latter was diluted to ½ by volume, thereby yielding an LLC solution. Employed as the LLC was a commercially available product containing a phosphoric acid compound as a corrosion inhibitor ingredient.

(2) Into a 100-cc sedimentation tube, 75 cc of the LLC solution and 22.5 g of a vulcanized rubber sample were introduced.

(3) The sedimentation tube was held in an oil bath at 80° C. for 96 hours.

(4) The vulcanized rubber sample was taken out from the sedimentation tube, whereas the sedimentation tube containing the LLC solution was left for 24 hours at room temperature.

(5) The supernatant in the sedimentation tube was removed, and 5 cc of the remaining LLC solution containing the sediment was put into a test tube.

(6) The test tube was subjected to a centrifuge (3000 rpm for 10 minutes) so as to complete precipitation, and the state thereof was observed.

TABLE 1

|  | Example | Comparative Example | | | |
|---|---|---|---|---|---|
|  | 1 | 1 | 2 | 3 | 4 |
| Added Compound *1 | | | | | |
| Species | C3 | Z | Z/C1/C | — | C1/C2 |
| Amount[pbw] | 2 | 5 | 2 5/4/1 | — | 4/1 |
| Evaluation Physical properties of vulcanized rubber | | | | | |
| TB kg/cm² *2 | 139 | 146 | 128 | 143 | 120 |
| EB % *3 | 270 | 220 | 300 | 220 | 290 |
| HS JIS-A *4 | 68 | 70 | 68 | 69 | 66 |
| Heat resistance (150° C. × 360 hr) | | | | | |
| Δ TB % *5 | −14 | −49 | −9 | −66 | −63 |
| Δ EB % *6 | −7 | −32 | −17 | −64 | −83 |

TABLE 1-continued

|  | Example | Comparative Example | | | |
|---|---|---|---|---|---|
|  | 1 | 1 | 2 | 3 | 4 |
| Δ HS points *7 | +7 | +6 | +13 | +13 | +12 |
| Radiator liquid Immersion test |  |  |  |  |  |
| State of deposition | no deposition | slurry | slurry | no deposition | no deposition |

TABLE 2

|  | Comparative Example | | | | |
|---|---|---|---|---|---|
|  | 5 | 6 | 7 | 8 | 9 |
| Added Compound *1 | C1 | C2 | C4 | C5 | C6 |
| Species Amount[pbw] | 5 | 5 | 5 | 5 | 5 |
| Evaluation Physical properties of vulcanized rubber |  |  |  |  |  |
| TB kg/cm² *2 | 140 | 62 | 153 | 155 | 122 |
| EB % *3 | 250 | 470 | 270 | 240 | 450 |
| HS JIS-A *4 | 67 | 56 | 63 | 66 | 59 |
| Heat resistance (150° C. × 360 hr) |  |  |  |  |  |
| Δ TB % *5 | −70 | −31 | −41 | −57 | −45 |
| Δ EB % *6 | −88 | −60 | −61 | −71 | −80 |
| Δ HS points *7 | +15 | +10 | +11 | +10 | +19 |

TABLE 3

|  | Comparative Example | | | | |
|---|---|---|---|---|---|
|  | 10 | 11 | 12 | 13 | 14 |
| Added Compound *1 | C7 | C8 | C9 | C10 | C11 |
| Species Amount[pbw] | 5 | 5 | 5 | 5 | 5 |
| Evaluation Physical properties of vulcanized rubber |  |  |  |  |  |
| TB kg/cm² *2 | 111 | 101 | 134 | 63 | 152 |
| EB % *3 | 500 | 500 | 370 | 620 | 210 |
| HS JIS-A *4 | 61 | 59 | 65 | 60 | 70 |
| Heat resistance (150° C. × 360 hr) |  |  |  |  |  |
| Δ TB % *5 | −42 | −38 | −40 | +105 | −64 |
| Δ EB % *6 | −82 | −76 | −65 | −72 | −52 |
| Δ HS points *7 | +18 | +24 | +11 | +12 | +4 |

*1 Added Compounds
Z: zinc oxide
C1: Sumilizer MB (manufactured by Sumitomo Chemical Co., Ltd.)
C2: Antigen RD (polymer of 2,2,4-trimethyl-1,2-dihydroquinoline, manufactured by Sumitomo Chemical Co., Ltd.)
C3: nickel diisobutyldithiocarbamate
C4: IRGANOX 1010 (tetrakis-[methylene-3-(3',5'-di-t-butyl-4'-hydroxyphenyl)propionate]methane, manufactured by Ciba-Geigy Co., Ltd.)
C5: Sanol 770 (bis(2,2,6,6-tetramethyl-4-piperidyl) sebacate, manufactured by Sankyo Seiyaku Co., Ltd.)
C6: NOCRAC NS10N (1,3-bis(dimethylaminopropyl)-2-thiourea, manufactured by Ouchi Shinkho Chemical Industries Co., Ltd.)
C7: Antigen W (1,1-bis(4-hydroxyphenyl)cyclohexane, manufactured by Sumitomo Chemical Co., Ltd.)
C8: Naugard 445 (substituted diphenylamine, manufactured by Uniroyal Chemical Co., Inc.)
C9: NOCRAC White (N,N'-di-2-naphthyl-p-phenylenediamine, manufactured by Ouchi Shinkho Chemical Industries Co., Ltd.)
C10: Antigen DA (reaction product of phenyl-β-naphthylamine and acetone, manufactured by Sumitomo Chemical Co., Ltd.)
C11: Antigen PA (phenyl-α-naphthylamine, manufactured by Sumitomo Chemical Co., Ltd.)
Amount of added compound: Expressed in terms of parts by weight per 100 parts by weight of the rubber polymer ingredient excluding extender oils.
*2 TB: tensile strength
*3 EB: elongation
*4 HS: hardness
*5 ΔTB: ratio of change in tensile strength before and after being left for 360 hours at 150° C. in the air
*6 ΔEB: ratio of change in elongation before and after being left for 360 hours at 150° C. in the air
*7 ΔHS: value of change in hardness before and after being left for 360 hours at 150° C. in the air
*8 Radiator liquid immersion test: Blank columns indicate cases where no measurement was effected.

The results shown in Tables 1 to 3 indicate the following. In the vulcanized rubber compositions of Comparative Examples 1 and 2 containing zinc oxide added thereto, zinc compounds dissolve into the radiator liquid, which may cause bad effect on cooling systems. On the other hand, heat resistance deteriorates in the vulcanized rubber compositions of Comparative Examples 3 to 14 which did not use zinc oxide. By contrast, in the vulcanized composition in accordance with Example 1 employing the compounds of the present invention without using zinc oxide is particularly excellent in heat resistance and inhibits zinc compounds from dissolving in the radiator liquid and affecting cooling systems.

As explained in the foregoing, the present invention can provide a rubber composition, a vulcanized rubber composition, and a heat-resistant product (e.g., radiator hose, heater hose, and radiator packing) which are mainly composed of ethylene/α-olefin copolymer rubber and/or ethylene/α-olefin/unconjugated diene copolymer rubber, employ no zinc-containing compound that causes the above-mentioned problem, and are excellent in age resistance.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rubber composition comprising:
   (A) at least one copolymer ingredient selected from the group consisting of ethylene/α-olefin copolymer rubber and ethylene/α-olefin/unconjugated diene copolymer rubber;
   (B) nickel diisobutyldithiocarbamate; and
   (C) carbon black; and not containing any compound having zinc.

2. A rubber composition according to claim 1, containing 1 to 20 parts by weight of (B) nickel diisobutyldithiocarbamate and 10 to 200 parts by weight of (C) carbon black per 100 parts by weight of said copolymer ingredient (A).

3. A vulcanized rubber composition obtained by vulcanizing the rubber composition of claim 1 with an organic peroxide.

4. A heat-resistant rubber product comprising the vulcanized rubber composition of claim 3.

5. A heat-resistant rubber product according to claim 4, wherein said heat-resistant rubber product is a product selected from the group consisting of radiator hose, heater hose, and radiator packing.

6. A vulcanized rubber composition obtained by vulcanizing the rubber composition of claim 2 with an organic peroxide.

7. A heat-resistant rubber product comprising the vulcanized rubber composition of claim 6.

8. A heat-resistant rubber product according to claim 7, wherein said heat-resistant rubber product is a product selected from the group consisting of radiator hose, heater hose and radiator packing.

9. A heat-resistant rubber product according to claim 5, wherein said heat-resistant rubber product is a radiator hose.

10. A heat-resistant rubber product according to claim 8, wherein said heat-resistant rubber product is a radiator hose.

* * * * *